(12) United States Patent
Prendergast et al.

(10) Patent No.: US 7,444,683 B2
(45) Date of Patent: Nov. 4, 2008

(54) HELMET MOUNTING ASSEMBLY WITH BREAK AWAY CONNECTION

(75) Inventors: Jonathon R. Prendergast, Newport Beach, CA (US); Ronald R. Soto, Laguna Hills, CA (US)

(73) Assignee: Norotos, Inc., Santa Ana, CA (US)

( * ) Notice: Subject to any disclaimer, the term of this patent is extended or adjusted under 35 U.S.C. 154(b) by 586 days.

(21) Appl. No.: 11/099,177

(22) Filed: Apr. 4, 2005

(65) Prior Publication Data

US 2006/0218703 A1  Oct. 5, 2006

(51) Int. Cl.
*A42B 3/00* (2006.01)
(52) U.S. Cl. ................................. 2/6.2; 2/422
(58) Field of Classification Search ............ 2/6.2, 2/6.3, 6.4, 6.5, 6.6, 6.7, 422, 424; 359/815, 359/816; 224/181, 183
See application file for complete search history.

(56) References Cited

U.S. PATENT DOCUMENTS

| | | | |
|---|---|---|---|
| 1,226,101 A | 5/1917 | Marsden | |
| 2,284,180 A | 5/1942 | Thomas | |
| 2,517,892 A | 8/1950 | Larrabee et al. | |
| 4,156,292 A | 5/1979 | Helm et al. | |
| 4,449,787 A * | 5/1984 | Burbo et al. | 313/524 |
| 4,553,873 A | 11/1985 | Salice | |
| 4,577,347 A | 3/1986 | Connon | |
| 4,660,943 A | 4/1987 | Ellis | |
| 4,671,697 A | 6/1987 | Ando et al. | |
| 4,689,834 A | 9/1987 | McCarthy et al. | |
| 4,697,783 A | 10/1987 | Kastendieck et al. | |
| 4,734,939 A | 4/1988 | Copp | |
| 4,987,608 A | 1/1991 | Cobb | |
| 5,176,342 A | 1/1993 | Schmidt et al. | |
| 5,179,735 A | 1/1993 | Thomanek | |
| 5,226,181 A | 7/1993 | Polednak et al. | |
| 5,331,684 A * | 7/1994 | Baril et al. | 2/6.2 |
| 5,339,464 A | 8/1994 | Dor | |
| 5,347,119 A | 9/1994 | Connors | |
| 5,408,086 A | 4/1995 | Morris et al. | |
| 5,465,124 A | 11/1995 | Nussenbaum | |
| 5,467,479 A | 11/1995 | Mattes | |
| 5,469,578 A | 11/1995 | Mattes | |

(Continued)

FOREIGN PATENT DOCUMENTS

WO   WO 99/65049   12/1999

OTHER PUBLICATIONS

U.S. Appl. No. 10/820,977, entitled Shroud Plate Attachment, by inventor Prendergast, filed Apr. 7, 2004.

(Continued)

*Primary Examiner*—Danny Worrell
(74) *Attorney, Agent, or Firm*—Christie, Parker & Hale, LLP (57) ABSTRACT

An assembly for mounting a night vision device to a helmet is provided that includes a helmet with a mounting device attached to the helmet, and a mounting assembly carrying a night vision device and having a helmet mounting surface for connection to the mounting device, wherein a break away connector is connected between the mounting device and the helmet mounting surface of the mounting assembly for establishing a break away connection between the helmet mounting surface of the mounting assembly and the mounting device.

17 Claims, 8 Drawing Sheets

U.S. PATENT DOCUMENTS

| | | |
|---|---|---|
| 5,471,678 A | 12/1995 | Dor |
| 5,506,730 A | 4/1996 | Morley et al. |
| 5,542,627 A | 8/1996 | Crenshaw et al. |
| 5,581,806 A | 12/1996 | Capdepuy et al. |
| 5,648,862 A | 7/1997 | Owen |
| 5,703,354 A | 12/1997 | Wannagot et al. |
| 5,822,126 A | 10/1998 | Cursolle et al. |
| 5,914,816 A | 6/1999 | Soto et al. |
| 6,249,386 B1 | 6/2001 | Yona et al. |
| D449,411 S | 10/2001 | Largeot |
| 6,457,179 B1 * | 10/2002 | Prendergast ............ 2/6.2 |
| 6,462,867 B2 | 10/2002 | Choinere |
| 6,472,776 B1 | 10/2002 | Soto et al. |
| 6,751,810 B1 | 6/2004 | Prendergast |
| 6,811,348 B1 | 11/2004 | Meyer et al. |
| 6,862,748 B2 | 3/2005 | Prendergast |
| 6,957,449 B2 * | 10/2005 | Prendergast ............ 2/422 |
| 7,219,370 B1 * | 5/2007 | Teetzel et al. ............ 2/6.2 |
| 2004/0244099 A1 | 12/2004 | Prendergast |

OTHER PUBLICATIONS

UK Search Report for application No. GB0606752.4 dated Aug. 3, 2006.

* cited by examiner

Fig. 16

HELMET MOUNTING ASSEMBLY WITH BREAK AWAY CONNECTION

FIELD OF THE INVENTION

This invention relates generally to a mounting assembly for attachment to a night vision device and for further attachment to a helmet, and more particularly to such a mounting assembly having a break away connection to the helmet.

BACKGROUND OF THE INVENTION

Night vision devices are commonly used by military personnel for conducting operations in low light or night conditions. The night vision devices used by the military typically include image intensifier tubes and associated optics that convert infrared and near infrared light into viewable images.

Mounting assemblies for mounting night vision devices to helmets are well-known in the art. Preferred ones of these mounting assemblies are attached to a helmet in a manner that allows a user to view a scene through the night vision device without having to hold the night vision device. Some of these mounting assemblies are removably attached to a helmet so that when the night vision device is not needed, such as in well lit surroundings, the mounting assembly may be detached from the helmet.

One such mounting assembly for removably attaching a night vision device to a helmet includes a locking plate which lockingly receives the mounting assembly and is releasable by actuation of a push button release mechanism. When using a helmet with such a mounting assembly, however, a user is at risk of injury if an impact to the night vision device and/or the helmet occurs.

For example, if a user wearing a helmet with such a mounting assembly were running and inadvertently crashed or otherwise entangled the night vision device with an external object, such as a tree branch or a line, the user's head and/or neck would likely be impacted or torqued in reaction to the external force being applied to the night vision device.

Accordingly, a need exists for an improved mounting assembly for attaching a night vision device to a helmet, which includes a break away connection to the helmet, such that when a relatively large external force is applied to the night vision device, the mounting assembly breaks away from the helmet rather than transmitting the external force to the head and/or heck of the user.

SUMMARY OF THE INVENTION

The present invention relates generally to an assembly which is fitted between a night vision device mount, which carries a night vision device, and a helmet attachment plate. According to one embodiment of the invention, the assembly permits automatic and immediate detachment of the night vision mount, and the night vision device attached thereto, upon a sudden and unforeseen impact on the night vision device. This affords a greater degree of safety to the user and his equipment than with any of the mounting assemblies previously developed. A tether cord may be attached at one end to the night vision device, and at another end to a fixed portion of the helmet for easy and quick retrieval and reattachment of the night vision device.

In one embodiment, the present invention is an assembly for mounting a night vision device to a helmet that includes a helmet with a mounting device attached to the helmet, and a mounting assembly carrying a night vision device and having a helmet mounting surface for connection to the mounting device, wherein a break away connector is connected between the mounting device and the helmet mounting surface of the mounting assembly for establishing a break away connection between the helmet mounting surface of the mounting assembly and the mounting device.

In another embodiment, the present invention is an assembly for mounting a night vision device to a helmet that includes a shroud plate mounted to the helmet and a locking plate releasably received by the shroud plate. The assembly also includes a mounting assembly carrying a night vision device; and a break away connector mounted to the mounting assembly and forming a break away connection with the locking plate.

In yet another embodiment, the present invention is an assembly for mounting a night vision device to a helmet that includes a shroud plate mounted to the helmet, and a locking plate releasably received by the shroud plate. The assembly also includes a mounting assembly carrying a night vision device, a latch plate mounted to the mounting assembly, and a break away connector mounted to the locking plate and forming a break away connection with the latch plate.

Other features and advantages of the present invention will become apparent from the following detailed description, taken in conjunction with the accompanying drawings which illustrate, by way of example, the features of the present invention.

BRIEF DESCRIPTION OF THE DRAWINGS

FIG. 19 is an exploded perspective view of an alternative break away connector similar to that of FIG. 12.

DETAILED DESCRIPTION OF THE DRAWINGS

As shown in FIGS. 1-19, embodiments of the present invention are directed to a mounting assembly for attachment to a night vision device and for further attachment to a helmet. In one embodiment, the mounting assembly includes a break away connection to the helmet, such that when a relatively large external force is applied to the night vision device, the mounting assembly breaks away from the helmet rather than transmitting the external force to the head and/or heck of the user.

Figure 1:
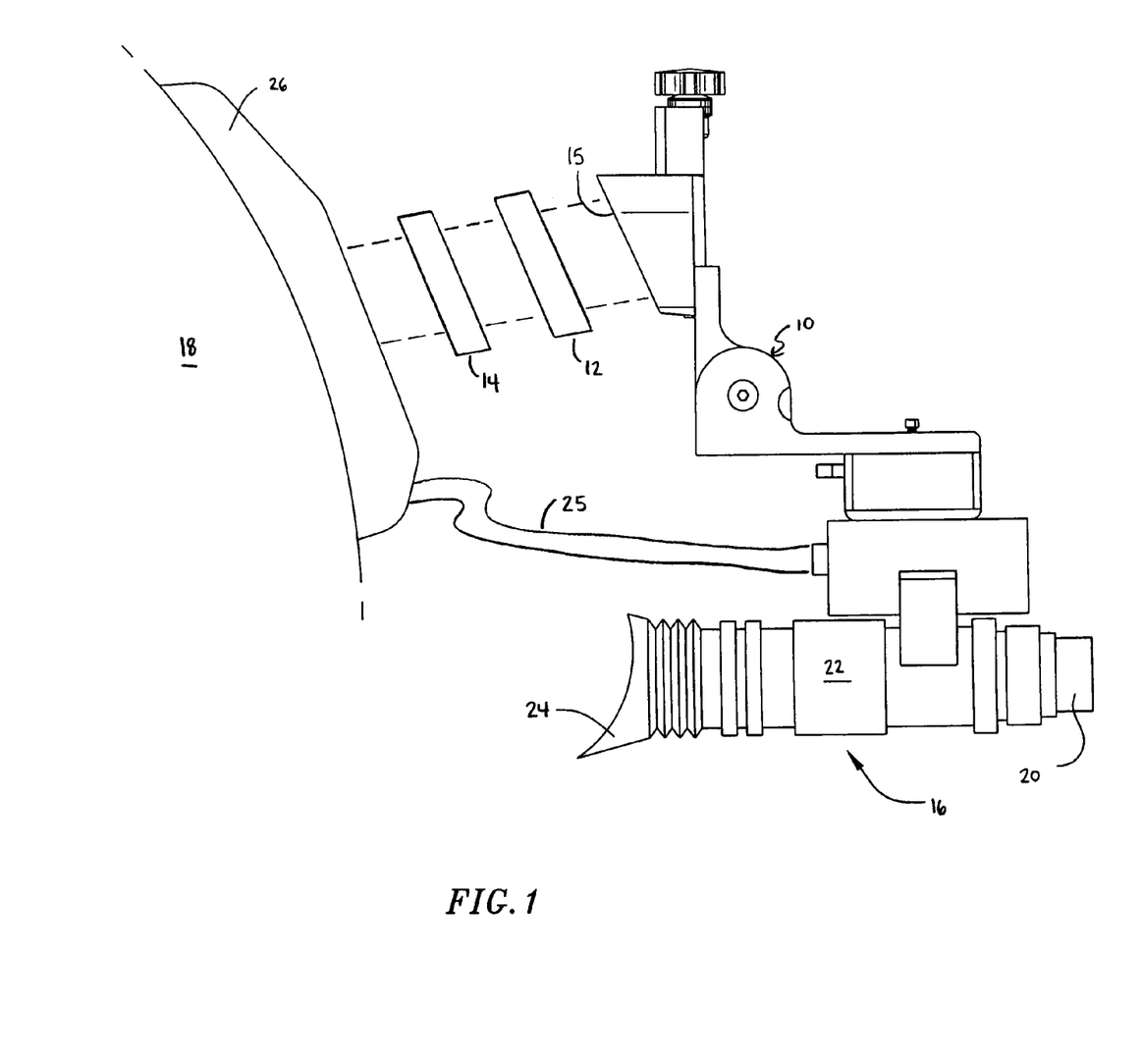
FIG. 1 is a side view of a mounting assembly for attaching a night vision device to a helmet, which includes a schematic representation of a locking plate and a break away connector according to one embodiment of the present invention.

FIG. 1 shows a mounting assembly 10 with a break away connector 12 (shown schematically) for attaching a night vision device 16 to a helmet 18 according to one embodiment of the present invention. The break away connector 12 may be integrally attached to, removably attached to, or fixedly attached to a helmet mounting surface 15 of the mounting assembly 10. The break away connector 12 also forms a break away connection either directly with a shroud plate 26, which is mounted to the helmet 18, or to a locking plate 14 which is removably connected to the shroud plate 26. As used herein a break away connection is used to refer to a removable connection which may be disengaged upon the exertion of at least a predetermined amount of force without requiring the actuation of a release mechanism. In one embodiment, a tether 25 is attached between the shroud plate 26, or another fixed portion of the helmet 18, and the mounting assembly 10 so that when the mounting assembly 10 is inadvertently detached from the shroud plate 26, the mounting assembly 10 remains connected to the helmet 18 and can be easily retrieved and reattached to the shroud plate 26. In the embodiment depicted in FIG. 1, the night vision device 16 includes a single objective lens 20, a housing 22 and a pair of eye pieces 24. In use, a user looks into the eye pieces 24 to see an enhanced image representative of the low-level light from a night scene which has entered the objective lens 20. In one embodiment, the night vision device 16 is a PVS7 night vision goggle, currently manufactured by ITT Corporation of Roanoke, Va.

The night vision device 16 may be removable or fixedly attached to the mounting assembly 10. As described in detail below, the mounting assembly 10 is removably attached to the helmet 18 by use of the break away connector 12. Preferably, the mounting assembly 10 includes mechanisms allowing for vertical adjustments, tilt adjustments, rotational adjustments and focal adjustments of the night vision device 16 relative to the helmet 18.

Although an exemplary embodiment of the mounting assembly 10 is shown in FIG. 1, in other embodiments the mounting assembly 10 may be any one of one a variety of mounting assemblies known in the art, such as any of the embodiments disclosed in U.S. patent application Ser. No. 10/818,828, filed on Apr. 5, 2004, the disclosure of which is incorporated by reference.

Figure 2:
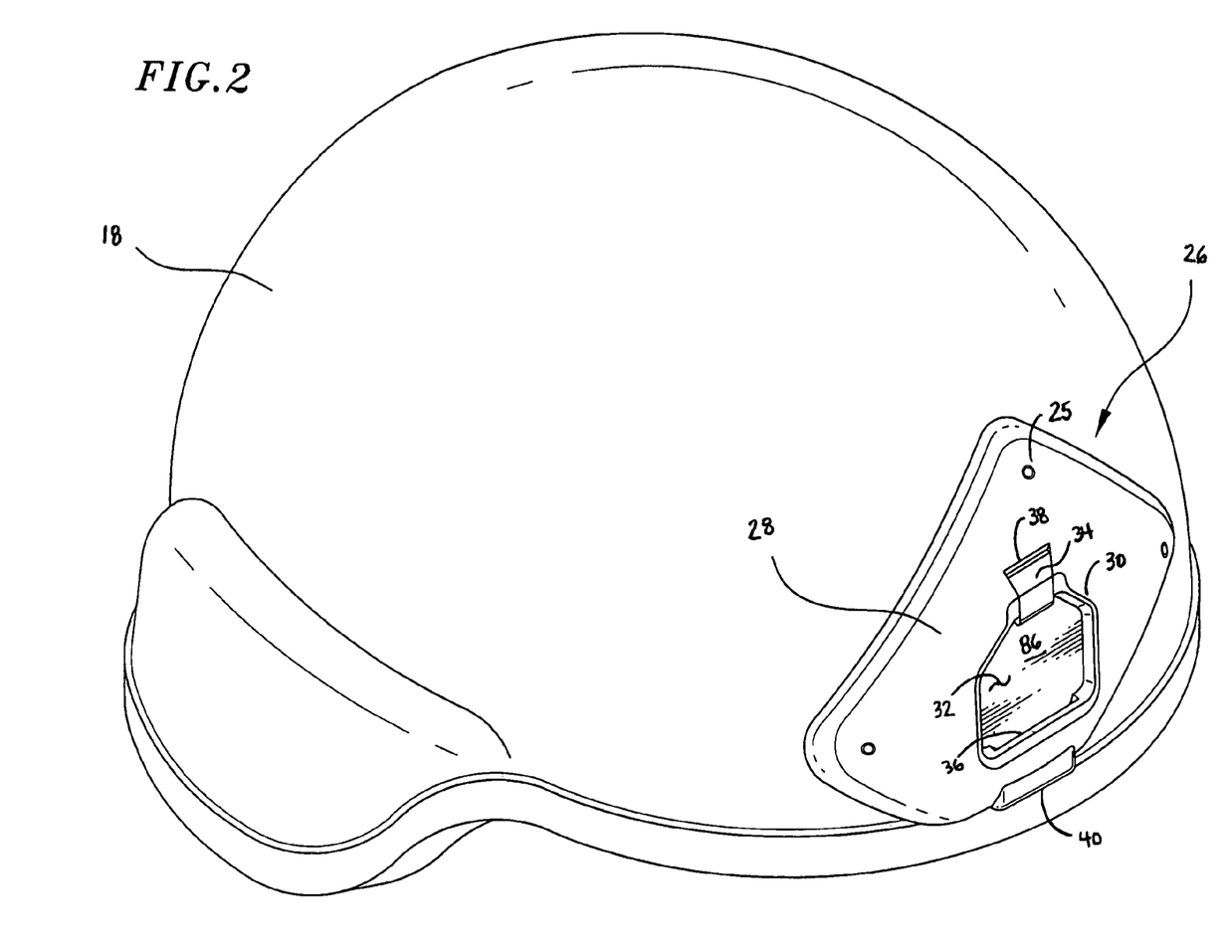
FIG. 2 is a perspective view, of a helmet having a shroud plate attached thereto.

As is also shown in FIG. 1 and in more detail in FIG. 2, attached to the helmet 18 is a shroud plate 26. In the embodiment of FIG. 1, the helmet 18 is a standard U.S. Army Kevlar composite helmet. An example of such a helmet 18 is shown in U.S. Design Pat. 449,411 to Largeot and is currently manufactured by CGF Helmets, Inc. of Akron, Ohio. However, in other embodiments, other helmets and/or other headgear may be used with the mounting assembly 10 of the present invention.

The shroud plate 26 may be attached to the helmet 18 by the use of one or more fasteners 25, or another appropriate attachment mechanism. In one embodiment, the shroud plate 26 includes a shell 28 and a receiving plate 30, which may be integrally formed with, or a separate component of, the shell 28. The receiving plate 30 includes an opening 32 for receiving the locking plate 14.

Figure 3:
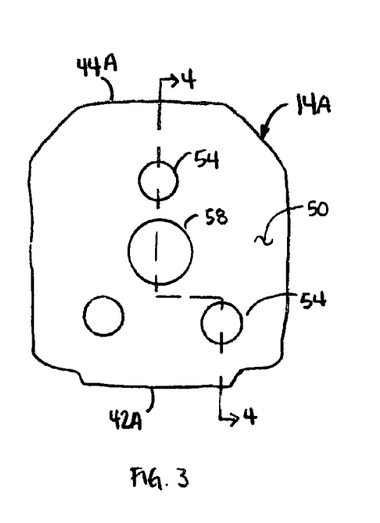
FIG. 3 is a front view of a locking plate according to one embodiment of the present invention.

The receiving plate 30 also includes an indentation 36 in a sidewall thereof for receiving a leading edge or lip of the locking plate 14 (see for example the leading edge 42A in the locking plate 14A of FIG. 3.) A lock 34 extends into the opening 32 of the receiving plate 30, such that in an engaged position the lock 34, in combination with the interaction of the indentation 36 of the receiving plate 30 and the leading edge of the locking plate 14, lockingly holds the locking plate 14 within the opening 32 of the receiving plate 30.

In one embodiment, the lock 34 is spring biased to extend into the opening 32 of the receiving plate 30, but is movably received within a channel 38 in the receiving plate 30 and/or the shell 28 upon a force which exceeds the spring bias. To insert the locking plate 14 within the receiving plate 30, the leading edge of the locking plate 14 is inserted into the indentation 36 in the receiving plate 30, and another edge of the locking plate 14 (see for example the edge 44A in the locking plate 14A of FIG. 3) is rotated toward and pressed against the lock 34 until the lock 34 is moved within the channel 38, allowing the locking plate 14 to move therepast. Once the locking plate 14 has moved past the lock 34, the spring bias of the lock 34 allows the lock 34 to snap back into its original position to capture the locking plate 14 within the opening 32 of the receiving plate 30

In one embodiment, a release mechanism 40 extends from the shroud plate 26 and is moveably connected to the lock 34, such that when the release mechanism 40 is depressed, the lock 34 is moved to a position where the lock 34 does not extend into the opening 32 of the receiving plate 30, and when the release mechanism 40 is released, the lock 34 returns to a position where the lock 34 extends into the opening 32 of the receiving plate 30.

Although an exemplary embodiment of the shroud plate 26 is shown in FIGS. 1 and 2, in other embodiments the shroud plate 26 may be any one of one a variety of shroud plates known in the art, attached to the helmet 18 by any appropriate means, such as any of the embodiments disclosed in U.S. patent application Ser. No. 10/802,977, filed on Apr. 7, 2004, the disclosure of which is incorporated by reference.

In one embodiment, as shown in FIGS. 3-7C a locking plate 14A, having a lip 42A and an edge 44A, is removably attachable to the shroud plate 26 of the helmet 18 as described above with respect to the locking plate 14 of FIG. 1. In this embodiment, the locking plate 14A further forms a magnetic break away connection with a break away connector 12A. The break away connector 12A, in turn, is attached to the mounting assembly 10 by a fastener 62A (see FIGS. 6A-6B), such as a screw or another appropriate attachment mechanism, having a portion which extends through an opening 64A in the break away connector 12A and engages the helmet mounting surface 15 of the mounting assembly 10 to connect the break away connector 12A thereto. Alternatively, the break away connector 12A may be integrally formed with the helmet mounting surface 15 of the mounting assembly 10.

The break away connection between the break away connector 12A and the locking plate 14A allows the mounting assembly 10 to form a break away connection with the helmet 18.

Figure 6A:
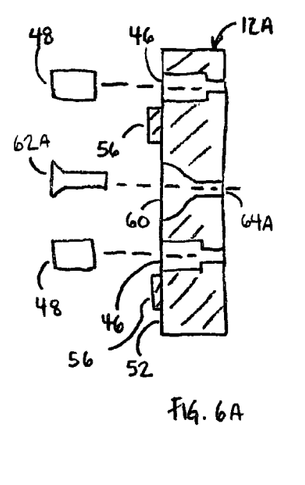
FIG. 6A is a cross-sectional view taken along the line 6-6 of FIG. 5 with magnets and fasteners shown exploded from the break away connector.
Figure 6B:
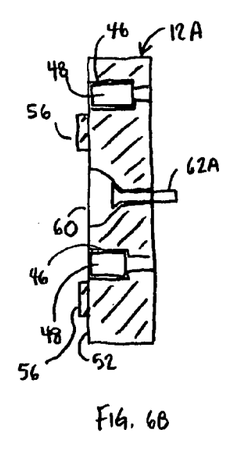
FIG. 6B is an assembly view of FIG. 6A.

In this embodiment, the break away connector 12A includes a plurality of openings 46, which each receive a corresponding magnet 48 via a press fit connection (as shown in FIG. 6B.) An outer surface 50 of the locking plate 14A, in turn, is composed of a magnet attracting material, such as a ferromagnetic material, for example iron, such that when an outer surface 52 of the break away connector 12A is placed in contact with the outer surface 50 of the locking plate 14A, the magnets 48 of the break away connector 12A form a magnetic connection with the outer surface 50 of the locking plate 14A, which may be broken away or disengaged from the locking plate 14A upon the exertion of at least a predetermined amount of force on the break away connector 12A and/or on the mounting assembly 10 to which the break away connector 12A is attached in a direction perpendicular to and away from the outer surface of the 50 locking plate 14A.

In one embodiment, as shown in FIG. 6B, each magnet 48 is mounted within a corresponding one of the openings 46 in the break away connector 12A, such that an end of each magnet 48 is flush with the outer surface 52 of the break away connector 12. This ensures a strong magnetic attraction between the magnets 48 of the break away connector 12A and the outer surface 50 of the locking plate 14A.

Although in an arrangement such as that described above, the magnetic attraction in the orthogonal direction is strong, the magnets are still susceptible to movement in a lateral direction. As such, in each of the embodiments of FIGS. 7A-7C a break away connector 12A'-12C' is provided that has a shape allowing for side connections of some of the magnets 48.

Figure 7A:
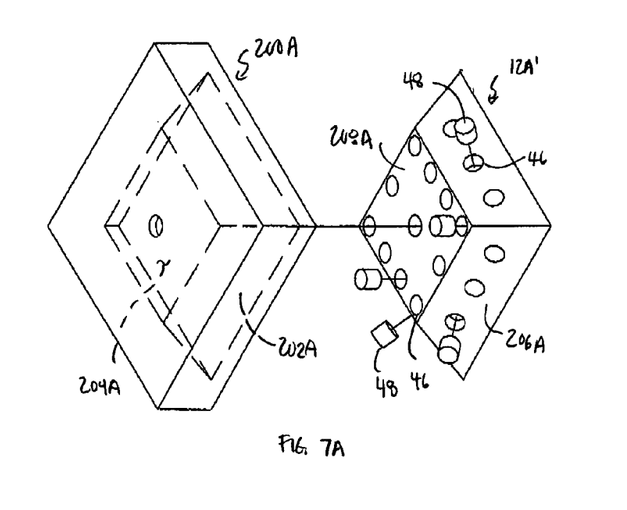
FIG. 7A-7C shows exploded perspective views of alternative break away connectors, as well as a plate with which each break away connector forms a break away connection.
Figure 7B:
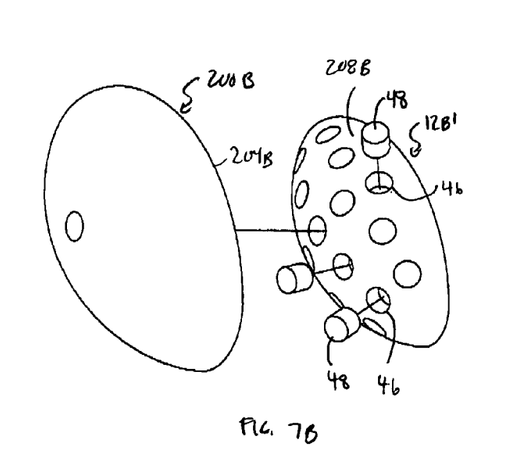
Figure 7C:
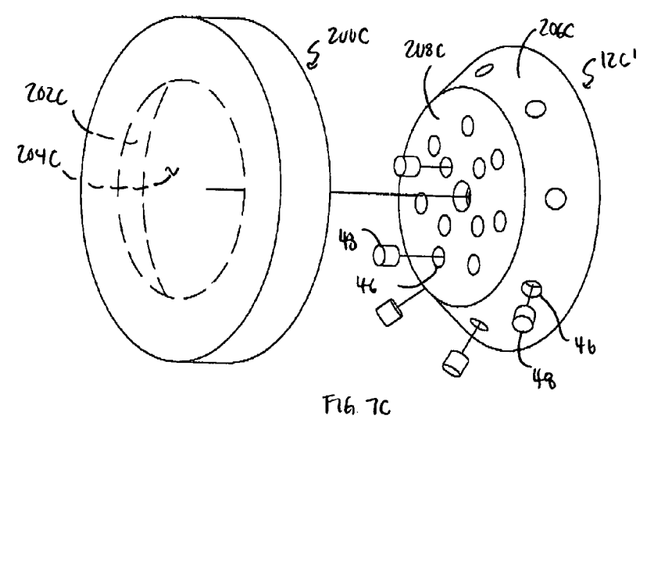
Figure 8:
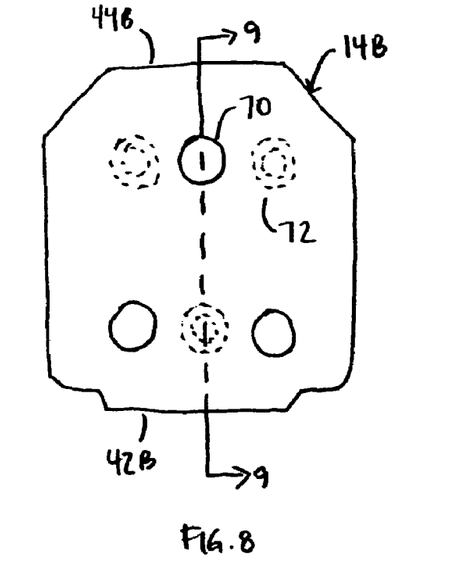
FIG. 8 is a front view of a locking plate according to another embodiment of the present invention.
Figure 9:
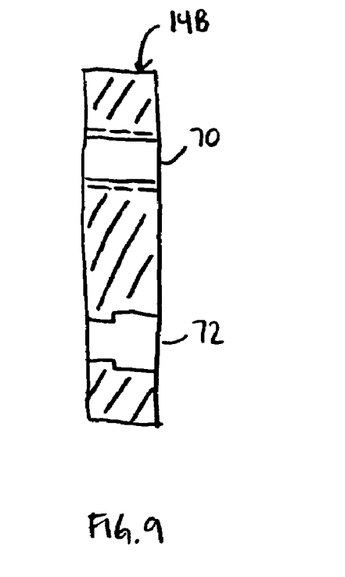
FIG. 9 is a cross-sectional view taken along the line 9-9 of FIG. 3.
Figure 10:
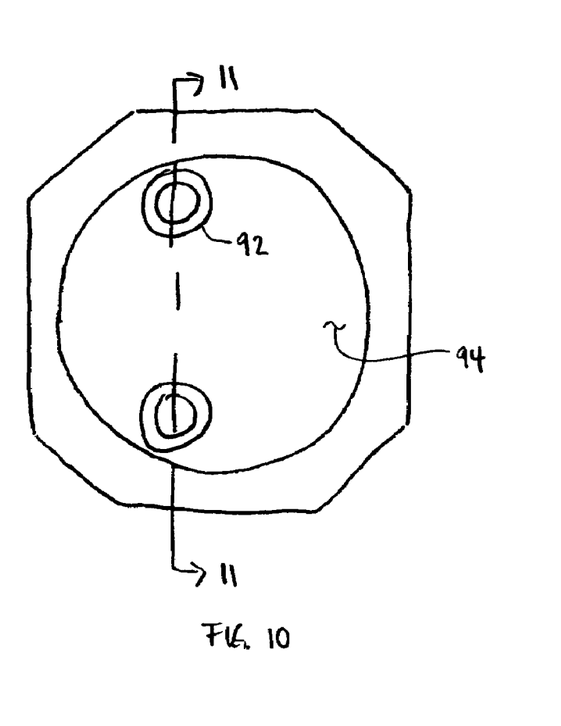
FIG. 10 is a front view of a latch plate according to one embodiment of the present invention.
Figure 11:
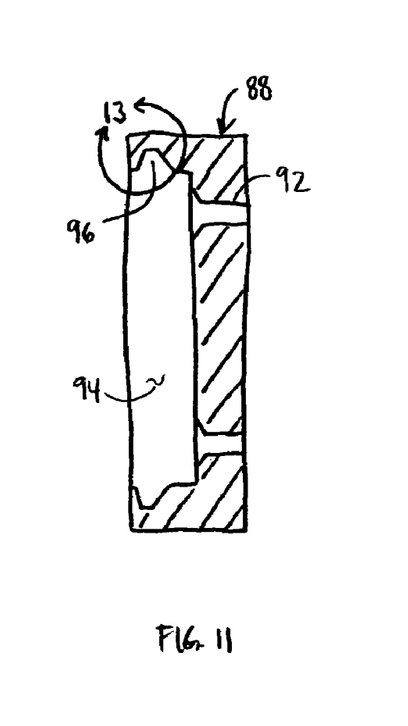
FIG. 11 is a cross-sectional view taken along the line 11-11 of FIG. 10.

For example, FIGS. 7A and 7C each include a ferromagnetic plate 200A and 200C for attachment to the locking plate 14B. Each ferromagnetic plate 200A and 200C includes sidewalls 202A and 202C leading to an inner surface 204A and 204C that is orthogonal to a front wall 208A and 208C of the corresponding break away connector 12A' and 12C'. Each break away connector 12A' and 12C' includes sides 206A and 206C extending from the front wall 208A and 208C and corresponding in shape to the sidewalls 202A and 202C of the ferromagnetic plate 200A and 200C.

As such magnets 48 within the sides 206A and 206C of the break away connectors 12A' and 12C' provide a strong lateral magnetic connection between each break away connector 12A' and 12C' and the ferromagnetic plate 200A and 200C; and magnets 48 within the front wall 208A and 208C of the break away connectors 12A' and 12C' provide a strong orthogonal magnet connection between the break away connectors 12A' and 12C' and the ferromagnetic plate 200A and 200C. FIG. 7B includes a ferromagnetic plate 200B with a curved inner surface 204B and the outer surface of the corresponding break away connector 12B' is similarly curved to mate the curve of the ferromagnetic plate 200B. As such, magnets 48 from within the break away connector 12B' extend in both orthogonal and side directions with respect to the ferromagnetic plate 200B. Consequently, magnetic connection in both the lateral and orthogonal directions are formed between the break away connector 12B' and the ferromagnetic plate 200B.

In one embodiment such as that shown in FIGS. 3-6B, the locking plate 14A includes a plurality of guidance openings 54, each for receiving a corresponding guidance member 56, such as a pin, which extends from the outer surface 52 of the break away connector 12A. Alternatively the guidance openings 54 may be disposed in the break away connector 12A, and the guidance pins 56 may be disposed on the locking plate 14A.

In addition, the locking plate 14A may include another guidance member 58, such as a ball, which is received with a guidance opening 60 in the break away connector 12A. Again, alternatively the guidance ball 58 may be disposed in the break away connector 12A, and the guidance opening 60 may be disposed on the locking plate 14A. The engagement of the guidance members 56 and 58, with the corresponding guidance openings 54 and 60 ensures a proper orientation of the break away connector 12A with respect to the locking plate 14A, and also provides for lateral support of the break away connector 12A with respect to the locking plate 14A when the break away connector 12A is attached thereto.

In another embodiment, the locking plate 14A is not used and instead the break away connector 12A forms a break away connection directly with the shroud plate 26. In such an embodiment, the shroud plate 26 includes the structures as described above for the locking plate 14A to form the break away connection with the break away connector 12A. In such an embodiment, the lock 34 and release mechanism 40 are not incorporated into the shroud plate 26.

In one embodiment, as shown in FIGS. 8-19 a locking plate 14B, having a lip 42B and an edge 44B, is removably attachable to the shroud plate 26 of the helmet 18 as described above with respect to the locking plate 14 of FIG. 1. In this embodiment, a break away connector 12B is securely attached to the locking plate 14B. The break away connector 12B further forms a mechanical break away connection with a latch plate 88, which in turn is connected to the mounting assembly 10.

In the depicted embodiment, the break away connector 12B is connected to the locking plate 14B by use of at least one threaded fastener 67 (see FIG. 12), having a portion which extends through an opening 68 in the break away connector 12B and engages a threaded opening 70 in the locking plate 14B. In one embodiment, the locking plate 14B contains three threaded openings 70 spaced apart in a triangular arrangement, with each threaded opening 70 receiving a corresponding threaded fastener 67 to secure the break away connector 12B to the locking plate 14B. However, in other embodiments any appropriate number of threaded fasteners and any appropriate attachment mechanism may be used to secure the break away connector 12B to the locking plate 14B.

Figure 12:
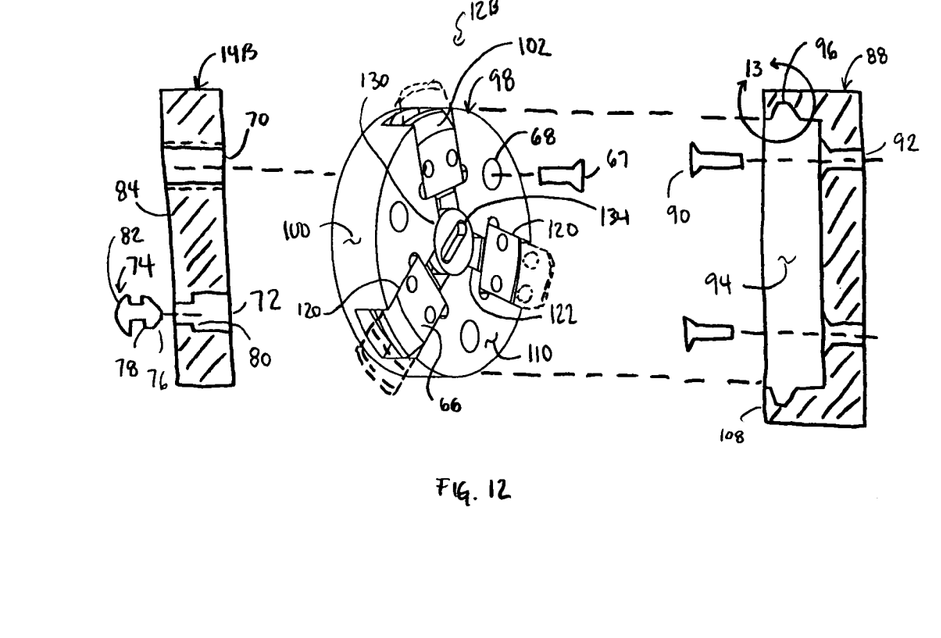
FIG. 12 is an exploded view of the cross-sections of the locking plate and the latch plate, with a perspective view of a break away connector according to one embodiment of the present invention.

As is also shown in FIG. 12, in one embodiment, the locking plate 14B includes openings 72 spaced in a triangular arrangement, which is rotated 180 degrees from the triangular arrangement of the fastener openings 70. However, in other embodiments other numbers of openings 72 and other arrangements may be used. Each opening 72 receives a soft, compressible material, such as a rubber insert 74, having a ramped portion 76, which leads to a shoulder 78. The shoulder 78 is inserted into a corresponding opening 72 to abut a shoulder 80 in the opening 72. This arrangement places a head portion 82 of the rubber insert 74 into abutment with a back wall 84 of the locking plate 14B.

As such, when the locking plate 14B is placed within the receiving plate 30 of the shroud plate 26, each rubber insert 74 abuts an inner wall 86 (see FIG. 2) of the receiving plate 30 of the shroud plate 26, thus preventing vibration, noise and wear which would otherwise occur due to the contacting of the back wall 84 of the locking plate 14B with the inner wall 86 of the receiving plate 30 of the shroud plate 26 if the rubber inserts 74 were not present.

Figure 4:
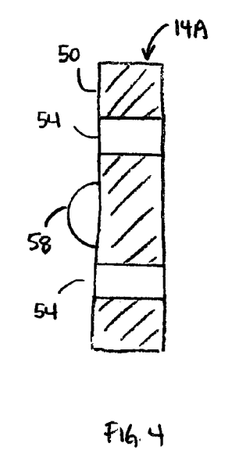
FIG. 4 is a cross-sectional view taken along the line 4-4 of FIG. 3.
Figure 5:
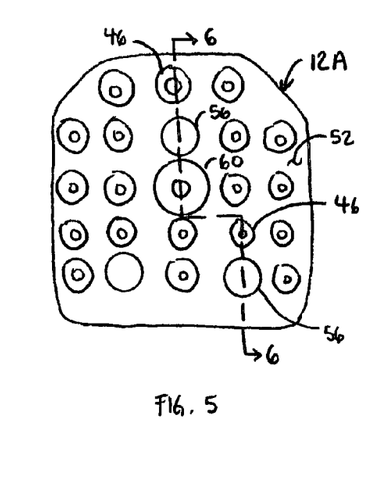
FIG. 5 is a break away connector according to one embodiment of the present invention.

Although not shown with respect the locking plate 14A of FIGS. 3 and 4, rubber inserts similar to those described above with respect to FIG. 12 may be similarly attached to the locking plate 14A of FIGS. 3 and 4 for the same purposes as described above.

As shown in FIG. 12, the latch plate 88 is attached to the mounting assembly 10 by at least one fastener 90, such as a screw or another appropriate attachment mechanism, having a portion which extends through an opening 92 in the latch plate 88 and engages a helmet mounting surface 15 of the mounting assembly 10 to connect the latch plate 88 thereto. Alternatively, the latch plate 88 may be integrally formed with the helmet mounting surface 15 of the mounting assembly 10.

As is also shown in FIG. 12, the latch plate 88 also includes a circular recess 94, which defines a circumferential notch 96 in an internal sidewall of the latch plate 88. As shown in FIG. 12, the break away connector 12B includes a disc 98 having an outer diameter 100, which is slightly smaller than the diameter of the circular recess 94 in the latch plate 88, such that the disc 98 may be received within the circular recess 94. The break away connector 12B also includes a plurality of latches 66, for example three latches 66, movably disposed in a radial direction with respect to the disc 98. Each latch 66 is spring biased radially outwardly with respect to the disc 98 to extend past the outer diameter 100 of the disc 98 (see dashed lines of FIG. 12 indicating the extended position of the latches 66), allowing each latch 66 to engage the sidewall notch 96 in the circular recess 94 of the latch plate 88 to form a break away connection therewith when the break away connector 12B is engaged with the latch plate 88. The break away connection between the break away connector 12B and the latch plate 88 allows the mounting assembly 10 to form a break away connection with the helmet 18.

Figure 13:
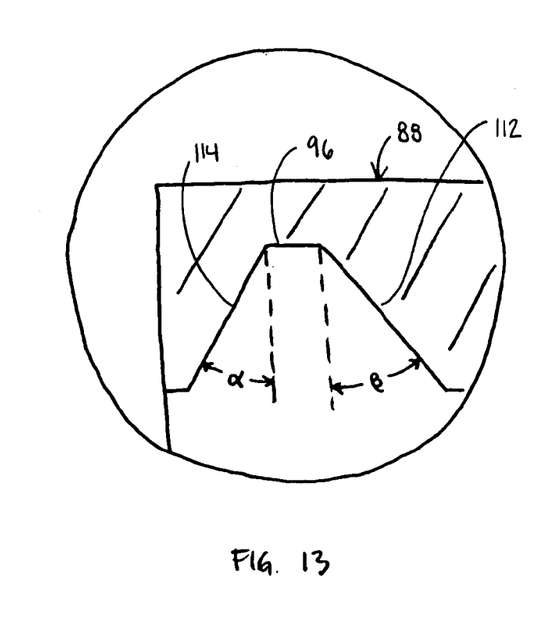
FIG. 13 is an enlarged view of a portion of the latch plate of FIG. 11.
Figure 14:
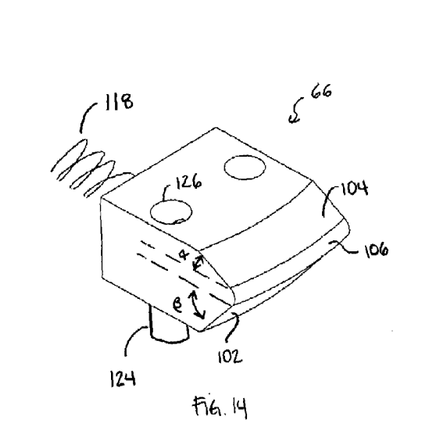
FIG. 14 is a perspective view of a latch for use with the break away connector of FIG. 12.

FIGS. 13 and 14 show enlarged views of the sidewall notch 96 and the latch 66, respectively. As shown in FIGS. 12 and 14, each latch 66 has a first ramp surface 102 and a second ramp surface 104 connected by a rounded interface 106. To form the break away connection between the break away connector 12B and the latch plate 88, a user holds the mounting assembly 10, with the latch plate 88 attached thereto, and brings a front face 108 of the latch plate 88 toward the break away connector 12B with a sufficient force to allow the front face 108 of the latch plate 88 to contact the first ramp surface 102 of the latches 66 on the break away connector 12B, and cause the latches 66 to be moved radially inwardly with respect to the disc 98 to a position substantially flush with the outer diameter 100 of the disc 98.

This allows the disc 98 to be moved within the circular recess 94 of the latch plate 88. Once the latches 66 are disposed within the circular recess 94 of the latch plate 88 to a sufficient depth, the second ramp surface 104 of the latches 66 slidably engages a second angled surface 114 of the sidewall notch 96, allowing the latches 66 to move radially outwardly by action of the spring force until the first ramp surface 102 of the latches 66 contacts a first angled surface 112 of the sidewall notch 96, establishing a full engagement between the latches 66 and the sidewall notch 96.

The connection between the break away connector 12B and the latch plate 88 can be broken away or disengaged upon the exertion of at least a predetermined amount of force on the latch plate 88, and/or on the mounting assembly 10 to which the latch plate 88 is attached, in a direction perpendicular to and away from the face 110 of the break away connector 12B to allow the second ramp surface 104 of the latches 66 to slide against the second angled surface 114 of the sidewall notch 96. This sliding engagement causes the latches 66 to be moved radially inwardly with respect to the disc 98 to a position flush with the outer diameter 100 of the disc 98, allowing the break away connector 12B to be disengaged from the latch plate 88.

In one embodiment, the angle α that the second ramp surface 104 of the latches 66 makes with the vertical is substantially equal to the angle α that second angled surface 114 of the sidewall notch 96 makes with the vertical; and the angle β that the first ramp surface 102 of the latches 66 makes with the vertical is substantially equal to the angle β that first angled surface 112 of the sidewall notch 96 makes with the vertical.

In one embodiment, the angle α that the second ramp surface 104 of the latches 66 makes with the vertical is smaller than the angle β that the first ramp surface 102 of the latches 66 makes with the vertical such that the second ramp surface 104 is steeper than the first ramp surface 102. As such, in this embodiment less force is required to engage the break away connector 12B with the latch plate 88 than is required to break away or disengage the break away connector 12B from the latch plate 88. For example, in a preferred embodiment, the angle α is approximately 30 degrees and the angle β is approximately 50 degrees.

Figure 15:
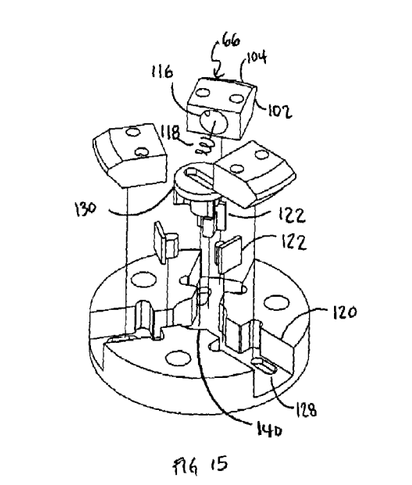
FIG. 15 is an exploded perspective view of the break away connector of FIG. 12.

Viewing FIGS. 12-15 together, each latch 66 includes a cavity 116 in a rear surface thereof, opposite from the ramps 102 and 104, which receives a biasing element, such as a compression spring 118. As shown in FIGS. 12 and 15, each latch 66 is radially moveable within an channel 120 in the disc 98, with each channel 120 extending from the center of the disc 98 to the outer diameter 100 of the disc 98. Also disposed within each channel is a push plate 122, such that each latch spring 118 is disposed between and compressed by the push plate 122 and its corresponding latch 66.

Also attached to each latch 66 is a pin 124, which is press fit into an aperture 126 in the latch 66 to extend from a lower surface of the latch 66. Each channel 120, in turn, includes a radially directed slot 128. The pin 124 of each latch 66 rides within the radial slot 128, the ends of which define the maximum radial inward movement and the maximum radial outward movement of the latch 66.

In one embodiment, the length of each spring 118 is sufficiently long such when the latches 66 are engaged with the circumferential notch 96 of the latch plate 88, the latch springs 118 are pre-loaded, i.e. not fully extended, so that the engagement of the latches 66 with the circumferential notch 96 is a snug fit.

In one embodiment, the break away connector 12B also includes a cam 130 (see FIGS. 12, and 15-17.) In one embodiment, the cam 130 is substantially disc-shaped and is disposed in the center of the break away connector 12B. The cam 130 includes a plurality of cam surfaces 132, each for contacting a corresponding one of the push plates 122, such that a rotation of the cam 130 with respect to the break away connector disc 98 causes different portions of the cam surfaces 132 to contact the push plate 122. A rotation of the cam 130 in a direction that allows a more radially outwardly extending portion of the cam surface 132 to contact the push plate 122, causes the cam 130 to move the push plates 122 radially outwardly within the channel 120, thus further compressing each latch spring 118. Thus when the latches 66 are engaged with the circumferential notch 96 of the latch plate 88 a tighter engagement occurs.

Similarly, a rotation of the cam 130 in a direction that allows a more radially inwardly extending portion of the cam surface 132 to contact the push plate 122, causes the cam 130 to allow the push plates 122 to be moved radially inwardly within the channel 120, by action of the latch springs 118, thus extending each latch spring 118. Thus when the latches 66 are engaged with the circumferential notch 96 of the latch plate 88 a looser engagement occurs.

Figure 16:
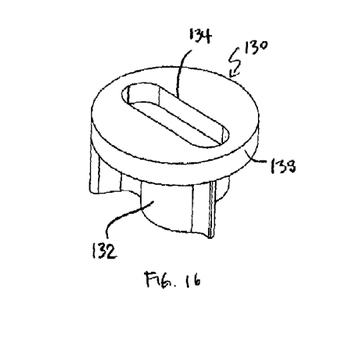
FIG. 16 is a top perspective view of a cam for use for use with the break away connector of FIG. 12.
Figure 17:
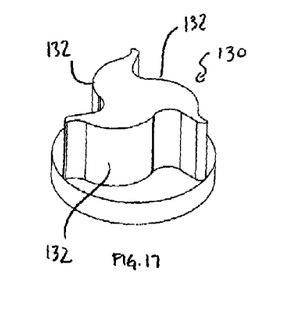
FIG. 17 is a bottom perspective view of the cam of FIG. 16.

In this manner, rotation of the cam 130 functions to vary the force that the latches 66 apply to the circumferential notch 96 of the latch plate 88 when the break away connector 12B is engaged therewith. To facilitate rotation of the cam 130 by a user, an outer surface of the cam 130 includes a slot 134, which in the depicted embodiment is shaped to receive a slot head screw driver, or a similar tool, which a user may use to rotate the cam 130.

In one embodiment, a rubber seal (not shown) is disposed in surrounding relation to the cam 130 between an outer diameter 138 of the cam 130 and a circular recess 140 in the break away connector disc 98, where the cam 130 is disposed. This rubber seal helps ensure that when the cam 130 is rotated by the user, a frictional engagement of the rubber seal with the circular recess 140 holds the cam 130 in the orientation desired by the user.

In an alternative embodiment where the lock 38 and the release mechanism 40 of the shroud plate 26 are not desired, the latch plate 88 may be secured directly to the shroud plate 26, such as by threaded fasteners. The break away connector 12B in such an embodiment is secured to the mounting assembly 10, such as by threaded fasteners. The break away connector 12B and the latch plate 88 otherwise remain the same structures as described above for forming a break away connection therebetween.

Figure 18:
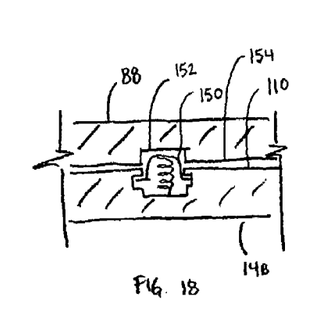
FIG. 18 is a cross-sectional view of a push button of an embodiment of the break away connector engaged with the latch plate to orient the break away connector with respect to the latch plate.

In either embodiment using the break away connector 12B and the latch plate 88, a push button 150 may extend from the front face of the break away connector 12B as shown in FIG. 18 to engage a cavity 152 in an inner wall 154 of the circular recess 94 of the latch plate 88 to ensure a proper orientation of the break away connector 12B with respect to the latch plate 88.

Alternatively, a proper orientation of the break away connector 12B with respect to the latch plate 88 may be ensured by altering the shape of the break away connector 12B and the circular recess 94 of the latch plate 88 to non-uniform shapes, such as a D-shape.

FIG. 19 includes another mechanical type break away connector 12D which functions substantially similar to the break away connector 12B described above with respect to FIGS. 12-15. As such the break away connector 12B of FIG. 19 may form a break away connection with the latch plate 88 of FIG. 12 in the manner described above with respect to the break away connector 12B.

As such only differences between the break away connector 12B of FIGS. 12-15 and the break away connector 12D of FIG. 19 are described below. For example, the break away connector 12D of FIG. 19 includes a cover plate 300 having openings 302 aligned with openings 304 in the disc 98D allowing fasteners (not shown) to extend through the openings 302 and 304 to attach the cover plate 300 to the disc 98D. The cover plate 300 thus attached maintains the latches 66D within the channels 120D. Although not shown, a similar cover plate may be attached to the break away connector 12B of FIG. 12 to achieve the same purpose.

As is also shown in FIG. 19, a screw 310 extends through a threaded opening 312 in the cover plate 300 and includes an end fixedly attached to a conically shaped cam 130D, such that threading the screw 310 into the threaded opening 312 in the cover plate 300 causes the conically shaped cam 130D to move downwardly. In this embodiment, a downward movement of the conically shaped cam 130D causes the corresponding push plates 122D to move radially inwardly, and the bias force transmitted from the springs 118D to the corresponding latches 66D to be decreased.

Similarly, threading the screw 310 out of the threaded opening 312 in the cover plate 300 causes the conically shaped cam 130D to move upwardly. In this embodiment, an upward movement of the conically shaped cam 130D causes the corresponding push plates 122D to move radially outwardly, and the bias force transmitted from the springs 118D to the corresponding latches 66D to be increased.

In this embodiment, the pin 124D may extend both below and above a latch 66D to which it is attached. The downward extending portion of the pin 124D rides within the slot 128D in the channel 120D of the disc 98D, while the upward extending portion of the pin 124D engages a lock-out plate 320. The lock-out plate is disposed between the cover plate 300 and the disc 98D. The lock-out plate 320 includes a partially enclosed slot 322.

By rotating the lock-out plate 320 with respect to the disc 98D in the direction of arrow 330 when the latches 66D are engaged with the circumferential notch 96 in the internal sidewall of the latch plate 88 (as described above with respect to the break away connector 12B of FIGS. 12-15), the upward extending portion of the pin 124D is trapped in the closed portion 333 of a corresponding one of the partially enclosed slots 322. In such a position, the latches 66D cannot be retracted, and hence cannot be broken away from the latch plate 88.

By rotating the lock-out plate 320 with respect to the disc 98D in the direction of opposite to that shown in arrow 330, the latches 66D are free to retract into or extend from the outer diameter 100D of the disc 98D and hence may form the break away connection with the latch plate 88. Although not shown in FIGS. 12-15, the break away connector 12B may include a lock-out plate similar to that described with respect to FIG. 19.

The preceding description has been presented with reference to various embodiments of the invention. Persons skilled in the art and technology to which this invention pertains will appreciate that alterations and changes in the described structures and methods of operation can be practiced without meaningfully departing from the principle, spirit and scope of this invention.

What is claimed is:

1. An assembly for mounting a night vision device to a helmet comprising:
   a mounting device attached to the helmet;
   a mounting assembly carrying a night vision device and having a helmet mounting surface for connection to the mounting device; and
   a break away connector connected between the mounting device and the helmet mounting surface of the mounting assembly for establishing a magnetic break away connection between the helmet mounting surface of the mounting assembly and the mounting device, wherein one of the break away connector and the helmet mounting surface is a magnet and the other of the break away connector and the helmet mounting surface is magnet attracting material.

2. An assembly for mounting a night vision device to a helmet comprising:
   a mounting device attached to the helmet; wherein the mounting device includes a shroud plate mounted on the helmet and a locking plate releasably received by the shroud plate;
   a mounting assembly carrying a night vision device and having a helmet mounting surface for connection to the mounting device and
   a break away connector connected between the mounting device and the helmet mounting surface of the mounting assembly for establishing a break away connection between the helmet mounting surface of the mounting assembly and the mounting device.

3. The assembly of claim 2, wherein the break away connector comprises at least one magnet and the locking plate comprises a magnet attracting material to form said break away connection between the break away connector and the locking plate.

4. The assembly of claim 3, wherein one of the break away connector and the locking plate comprises at least one alignment member and the other of the break away connector and the locking plate comprises a guidance opening for receiving the at least one alignment member.

5. The assembly of claim 2, wherein the break away connector is attached to the locking plate, and a latch plate is attached to the helmet mounting surface of the mounting assembly, and wherein the break away connector comprises at least one latch that is biased by a biasing member toward a notch in the latch plate when the break away connector is engaged with the latch plate to form said break away connection.

6. The assembly of claim 5, wherein the at least one latch comprises a first ramp surface that is contacted to move the at least one latch against the bias of the biasing member to engage the break away connector with the latch plate, and a second ramp surface that is contacted to move the at least one latch against the bias of the biasing member to disengage the break away connector from the latch plate.

7. The assembly of claim 6, wherein the second ramp surface is steeper than the first ramp surface, such that a force required to disengage the break away connector from the latch plate is greater than a force required to engage the break away connector with the latch plate.

8. The assembly of claim 5, wherein the break away connector comprises a cam, wherein a movement of the cam causes movement in the biasing member to vary a force that the biasing member imparts on the at least one latch.

9. An assembly for mounting a night vision device to a helmet comprising:
a mounting device attached to the helmet:
a mounting assembly carrying a night vision device and having a helmet mounting surface for connection to the mounting device: and
a break away connector connected between the mounting device and the helmet mounting surface of the mounting assembly for establishing a break away connection between the helmet mounting surface of the mounting assembly and the mounting device:
wherein the mounting device includes a shroud plate mounted on the helmet and a latch plate attached to the shroud plate; and
wherein the break away connector is attached to the helmet mounting surface of the mounting assembly, such that said break away connection is formed between the latch plate and the break away connector.

10. The assembly of claim 9, wherein the break away connector comprises at least one latch that is biased by a biasing member toward a notch in the latch plate when the break away connector is engaged with the latch plate to form said break away connection.

11. The assembly of claim 10, wherein the at least one latch comprises a first ramp surface that is contacted to move the at least one latch against the bias of the biasing member to engage the break away connector with the latch plate, and a second ramp surface that is contacted to move the at least one latch against the bias of the biasing member to disengage the break away connector from the latch plate.

12. An assembly for mounting a night vision device to a helmet comprising:
a shroud plate mounted to the helmet;
a locking plate releasably received by the shroud plate;
a mounting assembly carrying a night vision device;
a break away connector mounted to the mounting assembly and forming a break away connection with the locking plate;
wherein the break away connector comprises at least one magnet and the locking plate comprises a magnet attracting material to form said break away connection between the break away connector and the locking plate.

13. The assembly of claim 12 wherein one of the break away connector and the locking plate comprises at least one alignment member and the other of the break away connector and the locking plate comprises a guidance opening for receiving the at least one alignment member.

14. An assembly for mounting a night vision device to a helmet comprising:
a shroud plate mounted to the helmet;
a locking plate releasably received by the shroud plate;
a mounting assembly carrying a night vision device;
a latch plate mounted to the mounting assembly; and
a break away connector mounted to the locking plate and forming a break away connection with the latch plate;
wherein the break away connector comprises a disc having at least one latch that is biased by a biasing member to extend from an outer diameter of the disc: and
wherein the latch plate comprises a sidewall defining a circular recess for receiving the disc and a circumferential notch in the sidewall for receiving the at least one latch.

15. The assembly of claim 14 wherein the at least one latch comprises a first ramp surface that is contacted to move the at least one latch against the bias of the biasing member to engage the break away connector with the latch plate, and a second ramp surface that is contacted to move the at least one latch against the bias of the biasing member to disengage the break away connector from the latch plate.

16. The assembly of claim 15, wherein the second ramp surface is steeper than the first ramp surface, such that a force required to disengage the break away connector from the latch plate is greater than a force required to engage the break away connector with the latch plate.

17. An assembly for mounting a night vision device to a helmet comprising:
a mounting device attached to the helmet;
a mounting assembly carrying a night vision device and having a helmet mounting surface for connection to the mounting device; and
a break away connector connected between the mounting device and the helmet mounting surface of the mounting assembly for establishing a magnetic break away connection between the helmet mounting surface of the mounting assembly and the mounting device;
wherein the break away connector comprises at least one magnet and the mounting device comprises a shroud plate mounted on the helmet; and
wherein the shroud plate comprises a magnet attracting material to form said break away connection between the break away connector and the shroud plate.

* * * * *